Figure 1:
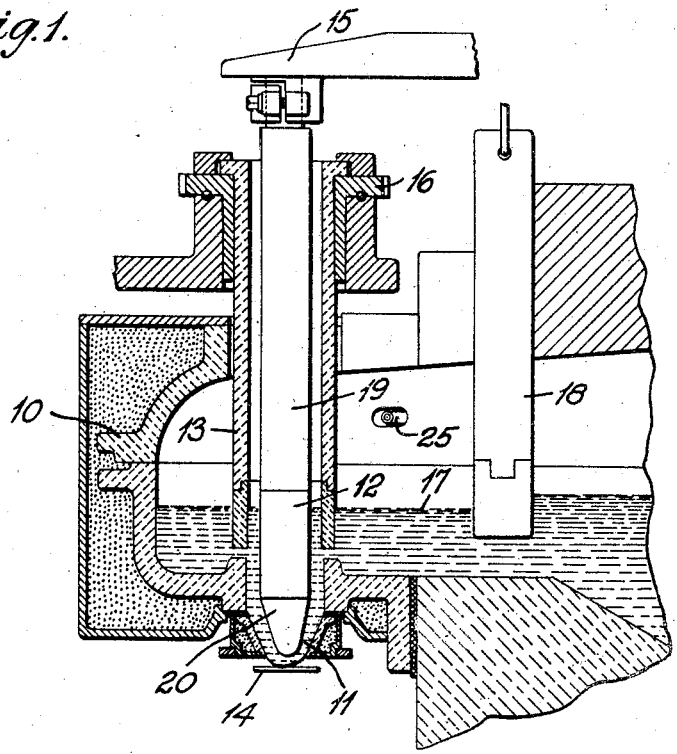

Dec. 25, 1928.

P. G. WILLETTS

COMPOSITE GLASS FEEDER IMPLEMENT

Filed June 4, 1926

1,696,661

Inventor:
Paul G. Willetts
by Robron A. Brown
Atty.

Patented Dec. 25, 1928.

1,696,661

UNITED STATES PATENT OFFICE.

PAUL G. WILLETTS, OF BERLIN, CONNECTICUT, ASSIGNOR TO HARTFORD-EMPIRE COMPANY, OF HARTFORD, CONNECTICUT, A CORPORATION OF DELAWARE.

COMPOSITE GLASS-FEEDER IMPLEMENT.

Application filed June 4, 1926. Serial No. 113,688.

My invention relates to apparatus for working molten glass, and more particularly to the construction of glass-working implements which are adapted to project into molten glass and operate continuously therein.

Glass-working implements of the character designated are frequently employed in glass-feeding apparatus, in which the molten glass is discharged from a container in regulable quantities for use in making articles of glassware. These implements are usually made of refractory material, such as fire clay molded in the desired shape, which may be in the form of a rotary stirrer, a reciprocating plunger, an oscillating paddle, or a skimmer; or the implement may be a rectangular or circular gate adapted to regulate the flow of glass from one container to another. Implements of this character are usually mounted outside of the glass container, and in order to perform their several functions of operation, project into the container through zones of different temperatures and into the molten glass. When in a molten state, the glass has an abrasive action on the refractory implements and it is necessary to provide an implement that shall be able to withstand this abrasive action as well as the severe temperature conditions to which the implements are subjected.

When the implement is composed entirely of one homogeneous refractory material, it may not have all the characteristics necessary for operating under the severe conditions of use. For example, a refractory implement may possess the desired heat-resisting and glass-resisting qualities to operate satisfactorily over a wide range of working conditions, but such an implement may not possess sufficient strength to enable the implement to operate in the viscous glass.

It has been proposed to divide the refractory implement into several sections and to provide reinforcing members to support the sections. When the implement is composed of several sections secured together by a reinforcing rod extending through the members and adapted to serve as a support, considerable difficulty has been experienced by the unequal expansion of the parts which causes objectionable warping. Advantage has also been taken of these reinforcing members to provide for circulating a cooling medium through the implement to prevent the destruction thereof. Experience has demonstrated that a solid implement of homogeneous refractory material is the most satisfactory, but such implements are also subject to warping, both during their process of making and by the severe working conditions to which they are subjected.

The present invention has for an object to provide a composite glass-working implement of refractory material, which shall comprise separate portions or sections of different refractory materials, each having certain characteristics to properly resist the particular conditions to which it is subjected.

Another object of the invention is to provide an implement of the character designated in which the several refractory portions comprising the implement shall be solid in cross sectional area and mechanically joined together to form an integral operative unit.

A further object of the invention is to provide a glass-working implement of the character designated, which shall be more durable and efficient than the implements heretofore employed. These and other objects will be more manifest from the following description and the following drawing, in which Figure 1 is a view in elevation of a glass feeder employing glass-working implements embodying my invention, and Fig. 2 is a detailed view in elevation of a glass-feeding plunger composed of two refractory materials joined together in accordance with the present invention.

Figure 2:
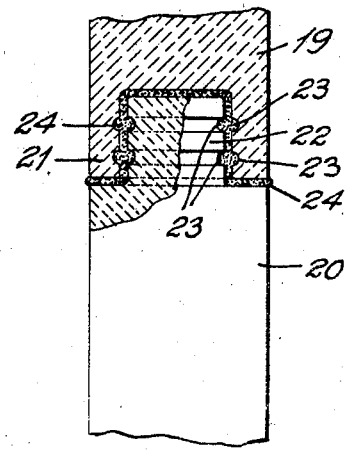

Referring to Fig. 1 of the drawing, there is illustrated a glass-feeding apparatus in which there are shown three forms of glass-feeding implements to which my invention may be applied. A supply of molten glass is maintained in a suitable heat insulated container 10, which is indicated as a forehearth connected to a glass-melting tank (not shown). The container is provided with a discharge outlet 11 through which the glass may be discharged in regulable quantities under the influence of a reciprocable plunger 12, a rotary tube 13 and cooperating shear members 14 in a manner well understood in the art. The plunger is secured to and reciprocated by an arm 15 and the tube is supported and rotated by a gear 16 from any convenient source of power.

The glass level in the container is indicated by the numeral 17 and this level is maintained constant by an adjustable gate 18 located near the discharge outlet. The glass in the container is maintained in a desired molten condition by means of auxiliary heating agencies indicated by the burner 25 which is adapted to maintain a flame in the interior of the container adjacent to the surface of the glass.

In the use of the three implements; namely, the plunger 12, the tube 13 and the gate 18, it will be noted that these implements are subjected to three distinct operating environments, including the cool atmosphere outside of the container, the flame-heated area above the glass, and the hot and abrasive molten glass.

The invention contemplates constructing the several parts of such glass-working implements of such refractory materials as to render the implement most durable and efficient in performing its particular function and to minimize any inherent weakness of structure as well as its tendency to warp. As shown in Fig. 2, the plunger 12 is divided into upper and lower portions 19 and 20, respectively. The upper part 19 is composed of a solid homogeneous refractory material such as Cheltenham clay. The material, when properly prepared, has the characteristic quality of strength and durability to withstand the shocks imparted to the plunger during its actuation and also to withstand the extreme variations in temperature to which the upper portion of the plunger is subjected. The lower portion 20 of the plunger is composed of a different solid homogeneous refractory material, such as sillimanite bonded with Kentucky ball clay. This material possesses the desired qualities for resisting the temperature of the glass as well as the abrasive characteristics thereof. These two portions are provided with inter-engaging parts 21 and 22, both of which have grooves 23 which serve to hold a refractory cement, indicated by the numeral 24. The grooves 23 in the inter-engaging parts 21 and 22 are in register so that the cement therein will act as a sort of a key between the joined together parts. The sections thus joined together provide a solid plunger composed of different refractory materials which shall be able to withstand the conditions imposed upon the several portions thereof. The clay materials named above for making the several refractory parts of the implement are by way of illustration only, as it is obvious that various kinds of clays may be mixed to form the different parts of the implement so that each part is able to withstand the working conditions imposed upon it.

While I have shown and described a cemented joint for connecting the different portions of the implement, it is obvious that mechanical connections may be provided on the individual sections, so that the several portions may be detachably joined together to form a solid unit. By thus joining together several sections of different refractory material, a composite implement is obtained which minimizes failures which have frequently occurred due to warping, cracking and other causes. In the operation of automatic glass-feeding machines employing glass-working implements of the character described, any small distortion of the implement may render it unfit for use, as the parts may be brought into abrasive contact, and the resulting damage may extend to the more expensive feeder parts. When the feeder parts fail for any reason, the efficiency of the apparatus is impaired and the associated glassware shaping machine depending on the apparatus for glass is also stopped, which results in curtailing the production of the machines.

Various changes in the construction shown, and various other applications of my invention may be made without departing from the scope of the appended claims.

What I claim is:

1. A composite implement for working molten glass comprising separate substantially solid sections of homogeneous refractory material joined together.

2. A composite implement for working molten glass comprising separate sections of different refractory materials, the complete glass-engaging portion of said implement being solid and homogeneous.

3. A composite implement for working molten glass comprising separate substantially solid sections of different refractory materials, and means for joining the sections together as a unit.

4. A composite implement for working molten glass comprising separate substantially solid sections of different refractory materials, and a refractory cement for joining the sections together as a unit.

5. A solid composite implement for working molten glass, comprising separate sections of homogeneous refractory materials, adjacent sections being provided with inter-engaging portions to form a joint and being otherwise solid in cross section, and a refractory cement for securing the inter-engaging portions together.

6. A refractory glass-working implement comprising a glass-engaging substantially solid section formed of a refractory material highly resistant to the abrasive and chemical actions of molten glass and having a relatively low coefficient of expansion, and a substantially solid refractory section of relatively great strength and also having a relatively low coefficient of expansion for supporting and moving said first named section in adhesive contact with molten glass.

7. A refractory glass-working implement comprising a glass-engaging substantially solid section formed of a refractory material highly resistant to the abrasive and chemical actions of molten glass and having a relatively low coefficient of expansion, such as sillimanite bonded with Kentucky ball clay, and a substantially solid refractory section of relatively great strength and also having a relatively low coefficient of expansion, such as Cheltenham clay, for supporting and moving said first named section in adhesive contact with molten glass.

8. A refractory glass-working implement comprising separate sections of refractory materials, adjacent sections having inter-engaging portions to form a joint, said inter-engaging portions having registering recesses in their confronting faces, and a refractory cement disposed between said inter-engaging portions and filling said registering recesses, said refractory cement constituting the sole means for securing said adjacent sections to each other, said recesses being of such shape and in such relation that the cement therein serves as a sort of a key between said sections.

9. A composite implement for working molten glass comprising a portion adapted to dip into molten glass and a supporting portion adapted to extend above the glass and to be actuated to move the implement in adhesive contact with the glass, the complete glass-engaging portion being solid and formed of a homogeneous refractory material having a relatively low coefficient of expansion and being adapted to remain practically intact and unchanged in form and composition when subjected to the abrasive and chemical actions and high temperature of molten glass, said supporting portion also having a relatively low coefficient of expansion and being adapted to remain unchanged in form and composition when subjected to relatively wide variations of temperature and to the stresses thereon resulting from the resistance of molten glass to the bodily movement of the glass-engaging portion therein.

10. A glass-working implement made of a plurality of sections of refractory materials joined together so as to form a practically solid monolithic structure adapted to remain practically intact and unchanged in form and composition when moved in adhesive contact with molten glass of any suitable viscosity and temperature for glass feeding operations.

Signed at Hartford, Connecticut, this 28th day of May, 1926.

PAUL G. WILLETTS.